July 25, 1933.  T. B. FARRINGTON  1,919,361
APPARATUS FOR FORMING PLASTIC STRIP MATERIAL
Filed May 3, 1932  2 Sheets-Sheet 1
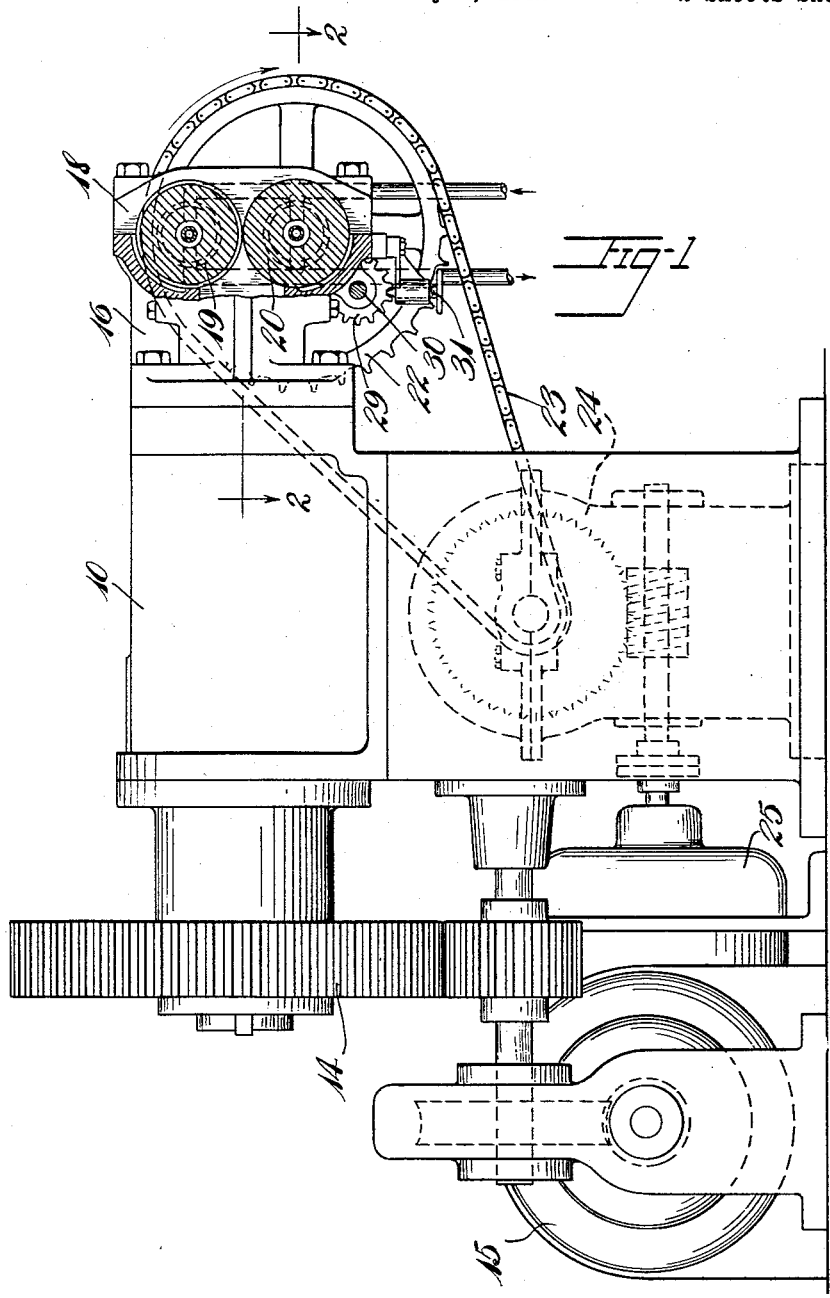
Inventor
Thayer B. Farrington
By Eakin & Avery
Attys

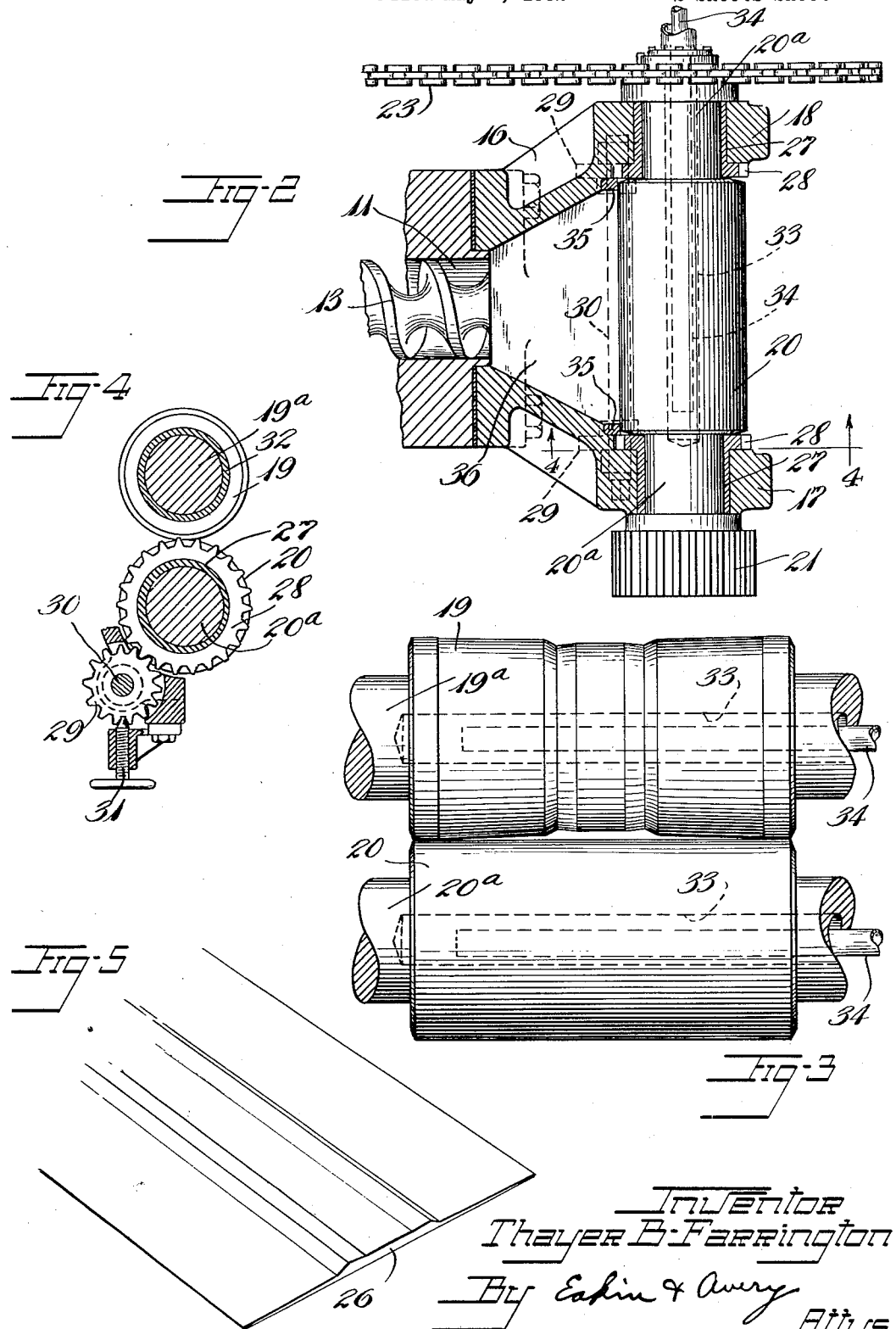

Patented July 25, 1933

1,919,361

UNITED STATES PATENT OFFICE

THAYER B. FARRINGTON, OF PASADENA, CALIFORNIA, ASSIGNOR TO THE B. F. GOODRICH COMPANY, OF NEW YORK, N. Y., A CORPORATION OF NEW YORK

APPARATUS FOR FORMING PLASTIC STRIP MATERIAL

Application filed May 3, 1932. Serial No. 608,914.

This invention relates to the production of plastic material in strip or sheet form, and especially to apparatus for forming sheet or strip articles of rubber composition, such as tread strips for automobile tires.

In the making of such articles heretofore the commonly used calendering procedure, and the alternative expedient of extruding the material through a fixed die, have not been wholly satisfactory, particularly for tread strips that are formed relatively thin at the marginal zones and thicker at the middle, the action of the calender rolls in drawing through the rubber from a bank in the bight of the rolls and, in the case of the extrusion procedure, the resistance of the fixed die, often causing a lack of uniformity in the tread thickness longitudinally of the strip and waviness, surface roughness, warping and other objectionable distortion, apparently due largely to the fact that, as the calender rolls exert a drawing force principally at the surface of the strip and, in regard the extrusion procedure, as the resistance to stock flow is exerted more strongly by the fixed die at the surface of the strip than at its interior, the resilient rubber of the relatively thin zones of the strip is not strained uniformly with the rubber of the thicker zones thereof in the operation, which causes subsequent non-uniform shrinkage and distortion.

In attempts made heretofore to extrude strips of considerably greater width than the diameter of the forcing screw by means of a fixed die it has usually been necessary to provide devices behind the die to obstruct partially the flow of stock in the zone of direct thrust from the forcing screw to the die opening and thus to cause an increase in the forcing pressures at the marginal zones of the opening which are laterally spaced from the central zone of direct thrust, so that the stock might be extruded at more nearly uniform speeds along the zones of the opening, but in such atttempts it has been found that for reasonably satisfactory results it has been necessary to use comparatively slow speeds of extrusion, and even then the strip has not been free from annoying distortion.

A further troublesome condition which has been frequently encountered in both the calendering and the extruding expedients is that due to the thinness to which it is usually desired to form the marginal zones of the strip, congestion of the plastic material at the corresponding zones of the calendar roll or die opening has often occurred, with resulting thin spots, holes and ragged margins in the formed strip, making it necessary to scrap or rework portions of the material.

Chief among the objects of the invention are to provide improved apparatus for forming strip material, especially strip tread rubber of considerable width and relative thinness, with avoidance to a large degree of the above discussed difficulties, and to provide for increased convenience, rapidity and economy of operation.

These and further objects will be apparent from the following description, reference being had to the accompanying drawings, in which:

Fig. 1 is a side elevation, with parts sectioned and broken away, of apparatus constructed according to and embodying the invention in its preferred form.

Fig. 2 is a section taken along the line 2—2 of Fig. 1.

Fig. 3 is an elevation of the delivery end of the apparatus, with parts broken away, showing the strip forming rolls.

Fig. 4 is a section taken along the line 4—4 of Fig. 2.

Fig. 5 is a perspective view of a portion of a strip of tread material formed by the apparatus of the invention.

In general, the apparatus illustrated in the drawings comprises a pair of moving surfaces in the form of cooperating rolls defining between them a relatively wide and thin opening for forming a strip of the desired shape, with a forcing chamber and material conducting passage located behind the bight of the rolls so constructed and arranged as to cause the plastic material to be forced to and through the opening effectively in accordance with its relatively wide and thin shape and varying thicknesses across its width, and the apparatus comprises also means for effecting adjustment and correlating the speeds of certain of the moving parts of the mechanism for most effective operation.

A casing 10, preferably steam jacketed, has in its interior a forcing chamber 11 into which the plastic material to be formed may be in the form of a feeding screw 13 rotatable in the chamber 11 by means of gearing 14 disposed at the rear end of the casing and driven by a motor 15.

At the forward end of the forcing chamber is a forming head 16 detachably secured to the casing 10. At its forward end the head is provided with a pair of transversely opposed bearing blocks 17 and 18 in which a pair of cooperating forming rolls 19 and 20 are mounted for rotating about parallel axes transverse to the head.

The shaft portions of the rolls extend beyond the bearing blocks and at one side of the head are geared together for rotation at equal speeds in opposite directions by means of a pair of gears, one of which is shown at 21 in Fig. 2, the direction of rotation being indicated by the arrow in Fig. 1. At the other side of the head is provided a driving mechanism for the rolls in the form of a sprocket 22 secured to the shaft of the lower roll and driven by means of a sprocket chain 23 from a variable speed device 24 that is driven by a motor 25. By this arrangement the speed of the forming rolls relative to the speed of the forcing screw 13 may be adjusted for the most effective operation, as by slowing down the rolls relative to the forcing screw the resistance of the rolls to stock flow may be increased and by relatively increasing somewhat the roll speed the resistance may be decreased. This makes possible, among other things, a close regulation of the strip thickness, as a change in the resistance of the rolls effects a change in the forcing pressure and this in turn affects the amount of recovery expansion of a resilient material such as tread rubber.

It is desirable that, supplementary to the roll-speed adjustment, means be provided for adjusting the relative positions of the forming rolls in a radial direction, precisely and in small increments, for forming the strip to the desired thickness within close limits, thereby making the roll-speed adjustment available in connection with other variable factors according to the nature of the plastic material, and for this purpose each shaft journal 20a of the roll 20 is provided with an eccentric bushing 27 rotatable on the journal and in the bearing block of the head. These eccentric bushings are provided with an interconnected adjusting and locking mechanism which may comprise a set of gear teeth 28 on each bushing meshing with respective pinions 29 mounted on a common, transversely disposed shaft 30 and a locking screw 31 for at least one of the pinions (Figs. 2 and 4). As shown in Fig. 4 the shaft journals 19a of the upper roll 19 may likewise be provided with bushings shown at 32, but these need not be of the eccentric type and may be secured against rotation in the bearing blocks.

Either or both of the forming rolls may be suitably grooved to provide an opening of the desired shape and size. In the embodiment illustrated, which is for the formation of strip rubber treads for tire casings, the lower roll 20 is plain and cylindrical and the upper roll 19 is centrally grooved and has marginal portions tapering gradually to the edges to give a formed strip of relatively wide and thin shape with a thickened middle zone, as shown at 26 in Fig. 5.

For heating or cooling the forming rolls the shafts of the latter may be formed with hollow interiors 33, 33 through which a heating or cooling fluid may be circulated by means of axially disposed conduits 34, 34.

In order to seal the space between the rolls and the casing head 16, suitably shaped plates 35, 35 may be provided in attachment to the head.

The casing head 16 is provided at its interior with a passage 36 for conducting the plastic material from the forcing chamber 11 to the forming rolls, this passage as shown in Fig. 2 having side walls diverging from the sides of the forcing chamber 11 to the lateral extremities of the opening between the forming rolls, the construction and arrangement being such that the central and thicker zone of the opening is in the zone of direct thrust of the forcing screw whereas the relatively thin marginal zones of the opening are located somewhat at the sides of the middle zone of direct thrust.

The somewhat lesser thrust on the plastic material toward the marginal zones of the opening due to the relative remoteness of these zones from the central zone of direct thrust is permissible in the improved apparatus inasmuch as the opening is defined by moving surfaces, which, as regards especially the marginal portions thereof are not subject to the considerable resistance to stock flow and congestion at these relatively thin portions of the opening that would exist if the opening were that of a fixed die. This condition of graduated thrust moreover is desirable for the formation of a strip of the general cross-section shown in Fig. 5, as it is approximately in accordance with the variation in thickness and consequently with the relative amounts of material required to be fed per unit of time at the several zones across the width of the opening for the production of a strip with minimum objectionable distortion. Also, the production of a strip of considerable width is permitted with a forcing screw of relatively small diameter and without sacrifice in the speed of production or causing excessive distortion of the strip.

The mechanisms for adjusting the relative positions of the rolls in a radial direction, and for regulating the relative speeds of the rolls and the forcing screw, are independently and conveniently arranged, affording adjustment without interrupting the continuous operation of the apparatus, and these adjustments permit the proper coordinating of the moving parts according to the particular plasticity, resilience and other characteristics of the stock for the most effective operation.

Variations may be made without departing from the scope of the invention as it is hereinafter claimed.

I claim:

1. Apparatus for forming strip rubber comprising, in combination, forcing means including a chamber having a discharge mouth at its forward end, a pair of movable surfaces defining between them a relatively thin strip-forming opening wider than said mouth, a material conducting chamber having diverging walls extending from said chamber mouth to the margins of said opening, and means for driving said movable surfaces.

2. Apparatus as defined in claim 1 including means operable during operation of the apparatus for varying the amount of spacing of said movable surfaces.

3. Apparatus as defined in claim 1 including means for varying the speeds of the movable surfaces and the material forcing means with relation to each other.

4. Apparatus for forming strip rubber comprising, in combination, a forcing screw, a pair of rolls in advance of said screw defining between them a strip forming opening, means for rotating said screw and for rotating said rolls, said means including means for varying the relative speeds of rotation of said screw and said rolls.

5. Apparatus for forming strip rubber comprising, in combination, a forcing screw, a pair of rolls in advance of said screw defining between them a relatively thin strip-forming opening wider than the diameter of said screw, a material conducting chamber having a pair of diverging walls extending between said screw and the margins of said opening, means for varying the relative positions of said rolls in a radial direction, and means for rotating said screw and for rotating said rolls, said rotating means including means for varying the relative speeds of said screw and said rolls.

6. Apparatus for forming strip rubber comprising, in combination, forcing means, a pair of rolls in advance of said forcing means defining between them a strip-forming opening, and means for driving said forcing means and said rolls at variable relative speeds.

THAYER B. FARRINGTON.